(12) United States Patent
Takagi

(10) Patent No.: US 12,167,121 B2
(45) Date of Patent: Dec. 10, 2024

(54) IMAGE CAPTURING APPARATUS, CONTROL METHOD OF IMAGE CAPTURING APPARATUS, AND STORAGE MEDIUM

(71) Applicant: CANON KABUSHIKI KAISHA, Tokyo (JP)

(72) Inventor: Yosuke Takagi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 223 days.

(21) Appl. No.: 17/856,778

(22) Filed: Jul. 1, 2022

(65) Prior Publication Data

US 2022/0337740 A1 Oct. 20, 2022

Related U.S. Application Data

(63) Continuation of application No. PCT/JP2020/047490, filed on Dec. 18, 2020.

(30) Foreign Application Priority Data

Jan. 6, 2020 (JP) ................................ 2020-000459
Sep. 8, 2020 (JP) ................................ 2020-150367

(51) Int. Cl.
*H04N 23/62* (2023.01)
*G06F 3/16* (2006.01)
*G10L 15/22* (2006.01)
*H04N 23/611* (2023.01)
*H04N 23/695* (2023.01)

(52) U.S. Cl.
CPC ............... *H04N 23/62* (2023.01); *G06F 3/16* (2013.01); *G10L 15/22* (2013.01); *H04N 23/611* (2023.01); *H04N 23/695* (2023.01); *G10L 2015/223* (2013.01)

(58) Field of Classification Search
CPC ................................... G06F 3/16; G10L 15/22
USPC ........................................................ 348/143
See application file for complete search history.

(56) References Cited

FOREIGN PATENT DOCUMENTS

| JP | 2008118526 A | | 5/2008 | |
|----|--------------|---|--------|---|
| JP | 2019106694 | * | 6/2019 | ............. G03B 15/00 |
| JP | 2019106694 A | | 6/2019 | |
| JP | 2019110525 A | | 7/2019 | |

OTHER PUBLICATIONS

JP2019106694 Machine Translation (Year: 2019).*

* cited by examiner

*Primary Examiner* — Nguyen T Truong
(74) *Attorney, Agent, or Firm* — Canon U.S.A., Inc. IP Division

(57) ABSTRACT

An image capturing apparatus includes a sound collection unit configured to collect a voice, an analysis unit configured to analyze a voice collected by the sound collection unit, an automatic image capturing unit configured to automatically capture an image, and a setting unit configured to set image capturing frequency of the automatic image capturing unit, wherein, in a case where a result of analysis by the analysis unit is a specific voice instruction, the setting unit sets the image capturing frequency higher after an operation is performed according to the instruction.

18 Claims, 9 Drawing Sheets

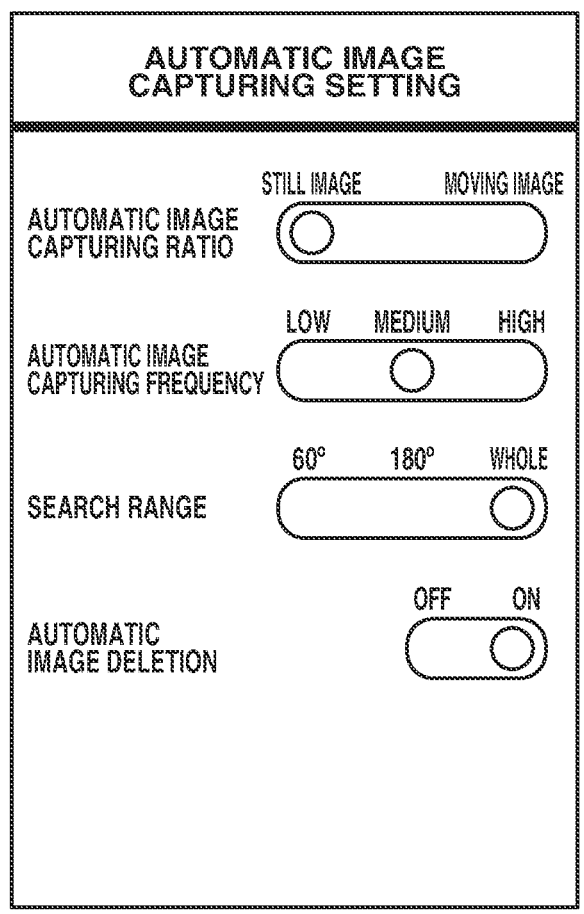

IMAGE CAPTURING APPARATUS, CONTROL METHOD OF IMAGE CAPTURING APPARATUS, AND STORAGE MEDIUM

CROSS-REFERENCE TO RELATED APPLICATIONS

This application is a Continuation of International Patent Application No. PCT/JP2020/047490, filed Dec. 18, 2020, which claims the benefit of Japanese Patent Applications No. 2020-000459, filed Jan. 6, 2020, and No. 2020-150367, filed Sep. 8, 2020, all of which are hereby incorporated by reference herein in their entirety.

BACKGROUND OF THE INVENTION

Field of the Invention

The present invention relates to an image capturing apparatus that can receive an instruction issued by voice.

Background Art

A lifelogging camera that automatically and periodically repeats image capturing and an image capturing apparatus that captures an image by determining an image capturing situation by the camera itself have been discussed in recent years. These devices are intended to obtain an image of a scene, desired by a user without the user being aware of it, by automatically capturing images. For example, an apparatus discussed in Japanese Patent Application Laid-Open No. 2019-110525 (PTL 1) automatically captures an image by determining an image capturing timing based on information about detection of an object face, the number of images captured in the past, the target number of images to be captured, and the like.

However, since an image is automatically captured, it does not always reflect a user's intention. Thus, it is not possible to capture an image at a timing desired by a user with only the technique discussed in PTL 1, and there is a possibility of missing an image capturing opportunity.

CITATION LIST

Patent Literature

PTL 1: Japanese Patent Laid-Open No. 2019-110525

SUMMARY OF THE INVENTION

According to an aspect of the present invention, an image capturing apparatus includes a sound collection unit configured to collect a voice, an analysis unit configured to analyze a voice collected by the sound collection unit, an automatic image capturing unit configured to automatically capture an image, and a setting unit configured to set image capturing frequency of the automatic image capturing unit, wherein, in a case where a result of analysis by the analysis unit is a specific voice instruction, the setting unit sets the image capturing frequency higher after an operation is performed according to the instruction.

Further features of the present invention will become apparent from the following description of exemplary embodiments with reference to the attached drawings.

BRIEF DESCRIPTION OF THE DRAWINGS

FIG. 9 is a diagram illustrating an example of a screen displayed on the external device.

DESCRIPTION OF THE EMBODIMENTS

Exemplary embodiments of the present invention will be described in detail below with reference to the attached drawings.

The exemplary embodiments described below are merely examples for implementing the present invention and can be appropriately modified or changed according to configurations and various conditions of apparatuses to which the present invention is applied. The exemplary embodiments can be appropriately combined with each other.

<Configuration of Image Capturing Apparatus>

Figure 1A:
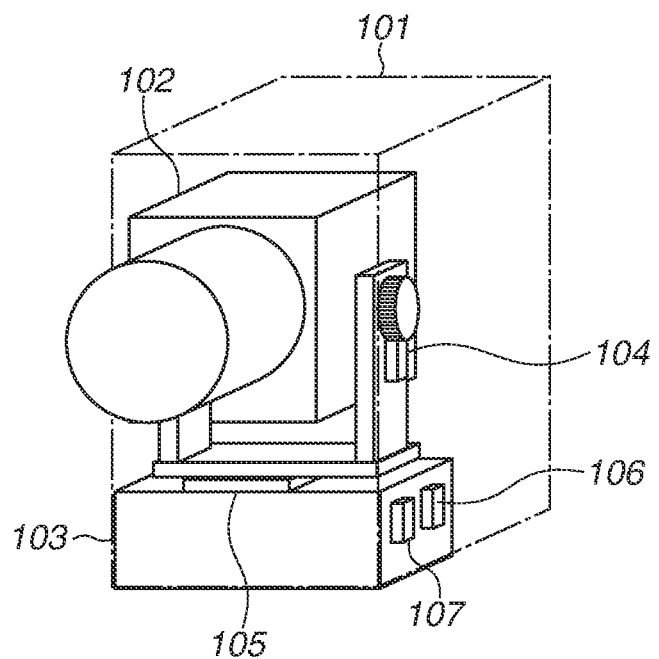
FIG. 1A is a diagram illustrating an example of an external appearance of an image capturing apparatus.

FIG. 1A schematically illustrates an image capturing apparatus according to a first exemplary embodiment.

Figure 1B:
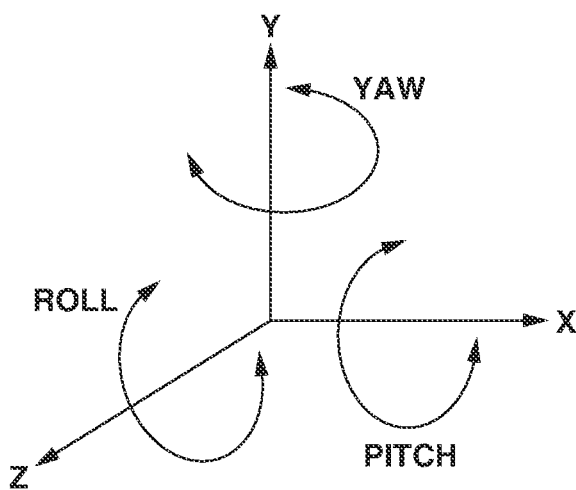
FIG. 1B is a diagram illustrating motion of the image capturing apparatus.

An image capturing apparatus 101 illustrated in FIG. 1A is provided with an operation member for use in an operation for switching power supply (hereinbelow, referred to as a power supply button, but the operation can be performed by a tap, a flick, and a swipe on a touch panel, for example). A lens barrel 102 as a housing for accommodating an image capturing lens group and an image capturing element for which are for capturing an image is provided with a rotation mechanism that is attached to the image capturing apparatus 101 and can drive the lens barrel 102 to rotate with respect to a fixing unit 103. A tilt rotation unit 104 is a motor drive mechanism that can rotate the lens barrel 102 in a pitch direction illustrated in FIG. 1B, and a pan rotation unit 105 is a motor drive mechanism that can rotate the lens barrel 102 in a yaw direction. Thus, the lens barrel 102 can rotate in one or more axial directions. FIG. 1B illustrates a definition of axes at a position of the fixing unit 103. Both an angular velocity meter 106 and an accelerometer 107 are mounted on the fixing unit 103 of the image capturing apparatus 101. A vibration of the image capturing apparatus 101 is detected based on the angular velocity meter 106 and the accelerometer 107, and the tilt rotation unit 104 and the pan rotation unit 105 are driven to rotate based on detected vibration angles. Accordingly, the vibration and tilt of the lens barrel 102, which is a movable unit, are corrected.

Figure 2:
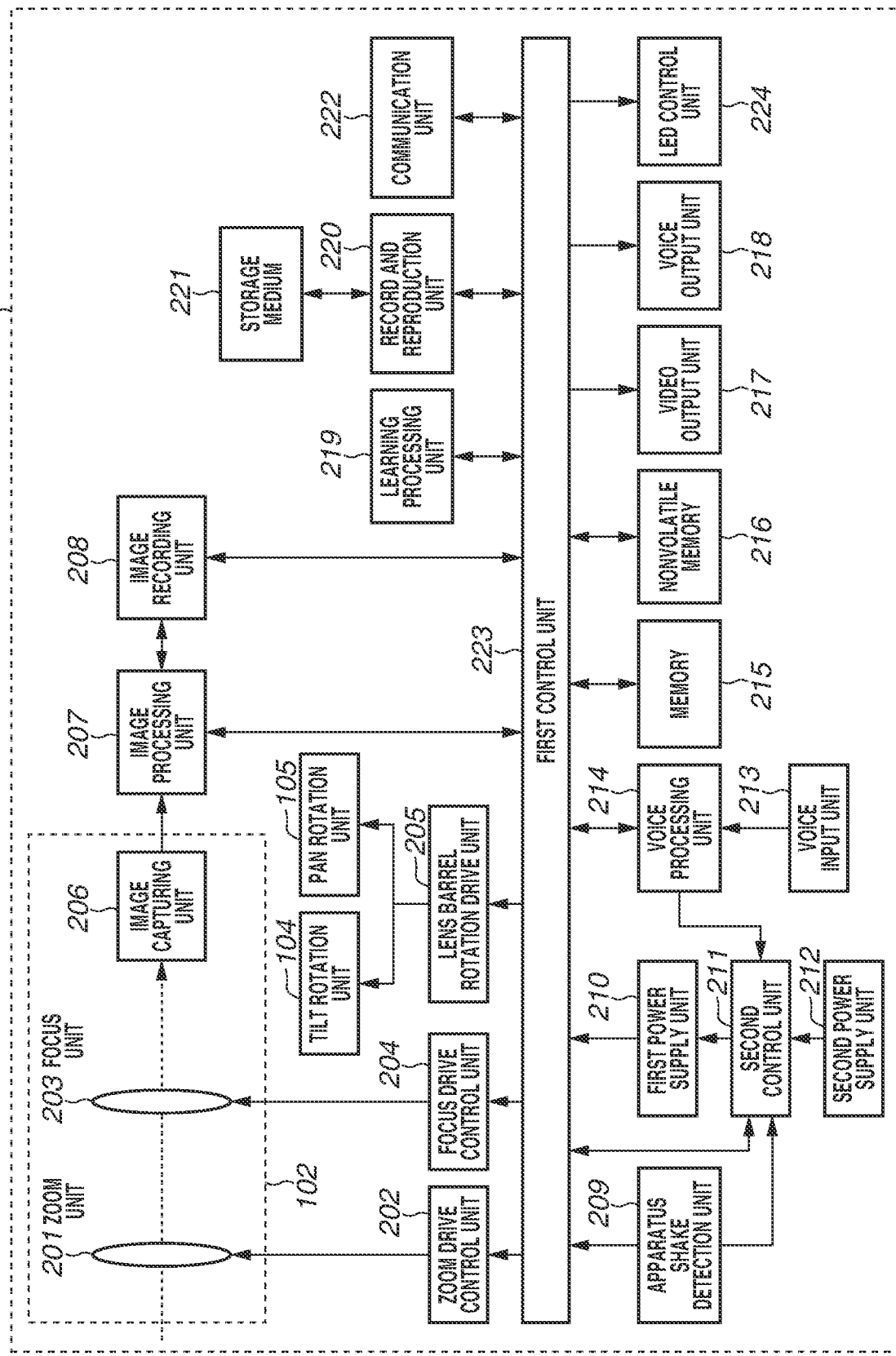
FIG. 2 is a diagram illustrating a configuration of the image capturing apparatus.

FIG. 2 is a block diagram illustrating a configuration of the image capturing apparatus 101 according to the present exemplary embodiment.

In FIG. 2, a first control unit 223 is configured with a processor (for example, a central processing unit (CPU), a graphics processing unit (GPU), a micro processor, and a micro processing unit (MPU)) and a memory (for example, a dynamic random access memory (DRAM) and a static random access memory (SRAM)). These units execute various types of processing to control each block in the image capturing apparatus 101 and to control data transfer among the blocks. A nonvolatile memory 216 is an electrically erasable and programmable read only memory (EEPROM) and stores a constant, a program, and the like for an operation of the first control unit 223.

In FIG. 2, a zoom unit 201 includes a zoom lens that performs variable magnification. A zoom drive control unit 202 controls driving of the zoom unit 201. A focus unit 203 includes a lens for adjusting focus. A focus drive control unit 204 controls driving of the focus unit 203.

In an image capturing unit 206, the image capturing element receives light entering through each lens group and outputs charge information, which corresponds to an amount of the light, to an image processing unit 207 as analog image data. The image processing unit 207 applies image processing, such as distortion correction, white balance adjustment, and color interpolation processing to digital image data, which is output by analog-to-digital (A/D) conversion on the analog image data, and outputs the processed digital image data. The digital image data output from the image processing unit 207 is converted by an image recording unit 208 in a recording format, such as a Joint Photographic Experts Group (JPEG) format, and the converted data is transmitted to the digital image data to a memory 215 and a video output unit 217 described below.

A lens barrel rotation drive unit 205 drives the tilt rotation unit 104 and the pan rotation unit 105 to drive the lens barrel 102 in a tilt direction and a pan direction.

An apparatus shake detection unit 209 is provided with, for example, the angular velocity meter 106 serving as a gyro sensor and the accelerometer 107 serving as an acceleration sensor that detect an angular velocity and acceleration, respectively, in the three axial directions of the image capturing apparatus 101. Based on detected signals, The apparatus shake detection unit 209 calculates a rotational angle, a shift amount, and the like of the image capturing apparatus 101.

A voice input unit 213 acquires a voice signal collected from a periphery of the image capturing apparatus 101 using a microphone provided in the image capturing apparatus 101, performs analog-to-digital conversion on the voice signal, and transmits the digital voice signal to a voice processing unit 214. The voice processing unit 214 performs processing related to voice, such as optimization processing, on the input digital voice signal. The voice signal processed by the voice processing unit 214 is transmitted to the memory 215 by the first control unit 223. The memory 215 temporarily stores an image signal and the voice signal obtained from the image processing unit 207 and the voice processing unit 214.

The image processing unit 207 and the voice processing unit 214 read the image signal and the voice signal temporarily stored in the memory 215, perform encoding on the image signal and the voice signal, and generate a compressed image signal and a compressed voice signal, respectively. The first control unit 223 transmits the compressed image signal and the compressed voice signal to a record and reproduction unit 220.

The record and reproduction unit 220 stores the compressed image signal and the compressed voice signal generated by the image processing unit 207 and the voice processing unit 214, respectively, other control data related to image capturing, and the like, in a storage medium 221. In a case where the voice signal is not compressed and encoded, the first control unit 223 transmits the voice signal generated by the voice processing unit 214 and the compressed image signal generated by the image processing unit 207 to the record and reproduction unit 220 and stores the signals in the storage medium 221.

The storage medium 221 may be a storage medium built into the image capturing apparatus 101 or a removable storage medium. As the storage medium 221, a medium that can store various types of data, such as the compressed image signal, the compressed voice signal, and the voice signal generated in the image capturing apparatus 101, and has a larger capacity than that of the nonvolatile memory 216 is generally used. For example, the storage medium 221 includes all types of storage media, such as a hard disk, an optical disk, a magneto-optical disk, a compact disk readable (CD-R), a digital versatile disk readable (DVD-R), a magnetic tape, a nonvolatile semiconductor memory, and a flash memory.

The record and reproduction unit 220 reads (reproduces) the compressed image signal, the compressed voice signal, the voice signal, various types of data, and a program stored in the storage medium 221. The first control unit 223 transmits the compressed image signal and compressed voice signal read from the storage medium 221 to the image processing unit 207 and the voice processing unit 214, respectively. The image processing unit 207 and the voice processing unit 214 temporarily store the compressed image signal and the compressed voice signal in the memory 215, decode the signals using a predetermined procedure, and transmit the decoded signals to the video output unit 217 and a voice output unit 218.

The voice input unit 213 includes a plurality of microphones provided in the image capturing apparatus 101, and the voice processing unit 214 can detect a direction of a sound on a plane on which the plurality of microphones is provided, and the detected sound is used for a search and automatic image capturing, which are described below. The voice processing unit 214 detects a specific voice command. A voice command includes some commands registered in advance, and also a user may be able to register a specific voice as a voice command in the image capturing apparatus 101. The voice processing unit 214 also performs sound scene recognition. In the sound scene recognition, a sound scene is determined using a trained model that is trained by machine learning in advance using a large amount of voice data. Specific algorithms for the machine learning include a nearest neighbor method, a naive Bayes method, a decision tree, and a support vector machine. There is also deep learning that uses a neural network to generate a feature amount and a coupling weighting coefficient for learning by itself. Any of the above-described algorithms that are available can be appropriately applied to the present exemplary embodiment.

According to the present exemplary embodiment, a neural network for detecting a specific scene, such as "cheering", "clapping", or "uttering a voice" is set in the voice processing unit 214. Further, the voice processing unit 214 is configured to output, in a case where a specific sound scene or a specific voice command is detected, a detection trigger signal to the first control unit 223 and a second control unit 211.

In other words, in the learning of the neural network of the voice processing unit 214, voice information of "cheering", "clapping", and "uttering a voice" scenes is prepared in advance. and the learning is performed using the voice information as an input and the detection trigger signal as an output.

The second control unit 211, which is provided separately from the first control unit 223 that controls an entire main system of the image capturing apparatus 101, controls the power supply of the first control unit 223.

A first power supply unit 210 and a second power supply unit 212 supply power for operating the first control unit 223 and the second control unit 211, respectively. In response to pressing performed on the power supply button provided in the image capturing apparatus 101, power is supplied to both the first control unit 223 and the second control unit 211, but the first control unit 223 is controlled to cause the first power supply unit 210 to turn off the power supply to itself. Even in a case where the first control unit 223 is not operating, the second control unit 211 operates, and information from the apparatus shake detection unit 209 and the voice processing unit 214 are input to the second control unit 211. The second control unit 211 is configured to perform determination processing for whether to start the first control unit 223, based on various input information, and to instruct, in a case where determination to start the first control unit 223 is performed, the first power supply unit 210 to supply power. According to the present exemplary embodiment, the first and second power supply units 210 and 212 supply power from a battery. In other words, the image capturing apparatus 101 can be a mobile terminal.

The voice output unit 218 outputs a preset voice pattern from a loudspeaker built into the image capturing apparatus 101, for example, at a time of image capturing.

A light emitting diode (LED) control unit 224 controls an LED provided in the image capturing apparatus 101 to light in a preset lighting and blinking pattern, for example, at a time of image capturing.

The video output unit 217 includes, for example, a video output terminal and transmits an image signal to a connected external display and the like to display a video thereon. The voice output unit 218 and the video output unit 217 may be a single combined terminal, such as a High-Definition Multimedia Interface (HDMI) (registered trademark) terminal.

A communication unit 222 that performs communication between the image capturing apparatus 101 and an external device transmits and receives data, such as the voice signal, the image signal, the compressed voice signal, and the compressed image signal. The communication unit 222 also receives an image capturing start/end command and a control signal related to image capturing, such as pan, tilt, and zoom drive, and drives the image capturing apparatus 101 based on an instruction from the external device that can mutually communicate with the image capturing apparatus 101. The communication unit 222 also transmits and receives information, such as various parameters, related to learning to be processed by a learning processing unit 219 described below between the image capturing apparatus 101 and the external device. The communication unit 222 is a wireless communication module, such as an infrared communication module, a Bluetooth® communication module, a wireless local area network (LAN) communication module, a wireless Universal Serial Bus (USB), and a Global Positioning System (GPS) receiver.

<System Configuration with External Communication Device>

Figure 3:
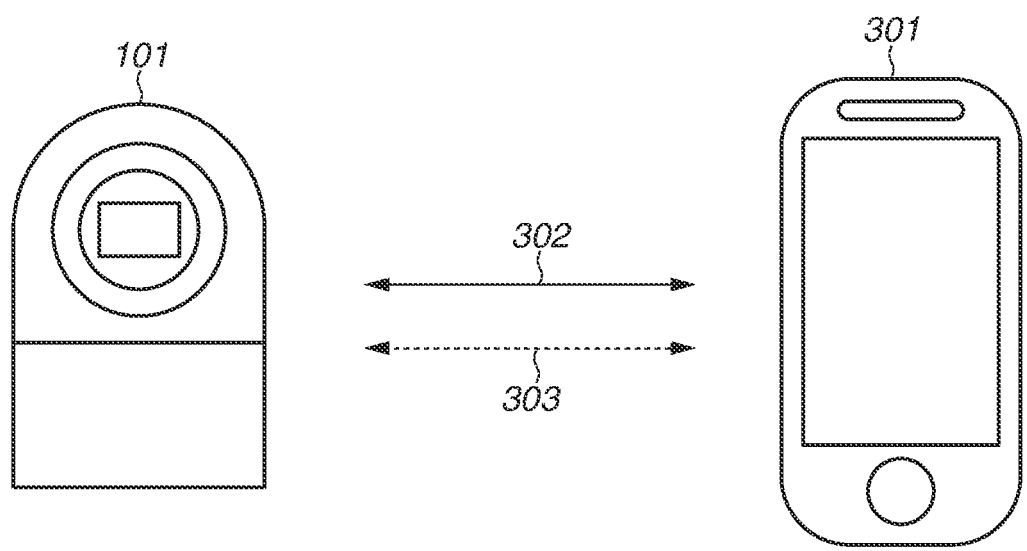
FIG. 3 is a diagram illustrating a configuration of the image capturing apparatus and an external device.

FIG. 3 illustrates a configuration example of a wireless communication system between the image capturing apparatus 101 and an external device 301 (also referred to as a smart device 301). The image capturing apparatus 101 is a digital camera having an image capturing function, and the external device 301 is a smart device including a Bluetooth® communication module and a wireless LAN communication module.

The image capturing apparatus 101 and the smart device 301 can communicate with each other via communication 302 based on, for example, the wireless LAN compliant with the Institute of Electrical and Electronics Engineers (IEEE) 802.11 standard series and communication 303 based on, for example, Bluetooth® Low Energy having a master-servant relationship between a control station and a subordinate station. The wireless LAN and Bluetooth® Low Energy are examples of communication methods. Each of the image capturing apparatus 101 and the smart device 301 may have two or more communication functions and, in a case where, for example, one communication function of performing communication in the relationship between the control station and the subordinate station can control the other communication function, another communication method may be used. However, in the present exemplary embodiment, first communication, such as the wireless LAN communication, can perform communication at a higher speed than second communication, such as Bluetooth® Low Energy communication, and the second communication is at least either one of consuming less power and having a shorter communicable distance than the first communication, without loss of generality.

<Configuration of External Communication Device>

Figure 4:
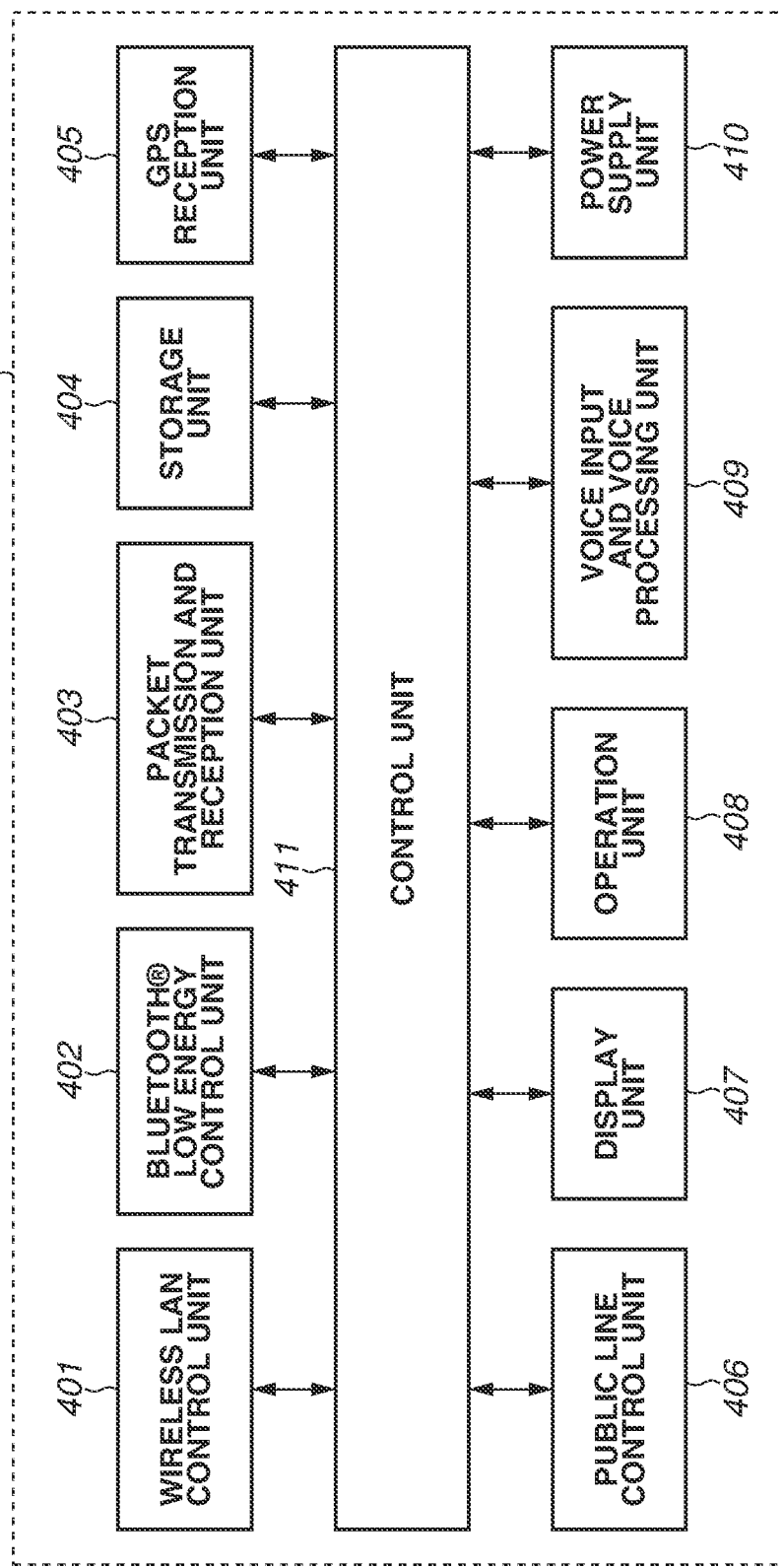
FIG. 4 is a diagram illustrating a configuration of the external device.

A configuration of the smart device 301 as an example of an external communication device is described with reference to FIG. 4. The smart device 301 is a mobile phone, namely a mobile terminal.

The smart device 301 includes, for example, a public line control unit 406 for public wireless communication, in addition to a wireless LAN control unit 401 for the wireless LAN and a Bluetooth® Low Energy control unit 402 for Bluetooth® Low Energy. The smart device 301 further includes a packet transmission and reception unit 403. The wireless LAN control unit 401 performs radio-frequency (RF) control of the wireless LAN, communication processing, protocol processing related to a driver that performs various control on the communication by the wireless LAN compliant with IEEE 802.11 standard series, and protocol processing related to the wireless LAN communication. The Bluetooth® Low Energy control unit 402 performs RF control of Bluetooth® Low Energy, communication processing, protocol processing related to a driver that performs various control on the communication by Bluetooth® Low Energy, and protocol processing related to the Bluetooth® Low Energy communication. The public line control unit 406 performs RF control of the public wireless communication, communication processing, protocol processing related to a driver that performs various control on the public wireless communication, and protocol processing related to the public wireless communication. The public wireless communication is compliant with, for example, International Multimedia Telecommunications (IMT) standards and Long Term Evolution (LTE) standards. The packet transmission and reception unit 403 performs processing for executing at least either one of transmission and reception of a packet related to the communication by the wireless LAN and Bluetooth® Low Energy and the public wireless communication. According to the present exemplary embodiment, it is described that the smart device 301 performs at least either one of transmission and reception of a packet in the communication, but another communication form, such as line exchange, may be used in addition to packet exchange.

The smart device 301 further includes, for example, a control unit 411, a storage unit 404, a GPS reception unit 405, a display unit 407, an operation unit 408, a voice input and voice processing unit 409, and a power supply unit 410. The control unit 411 entirely controls operations of the smart device 301 by executing, for example, a control program stored in the storage unit 404. The storage unit 404 stores, for example, the control program to be executed by the control unit 411 and various information, such as a parameter for use in the communication. Various operations described below are realized by the control unit 411 executing the control program stored in the storage unit 404.

The power supply unit 410 supplies power to the smart device 301. The display unit 407 has a function of, for example, outputting visually recognizable information, such as information using a liquid crystal display (LCD) and an LED, or outputting a sound from a loudspeaker and displays various information. The operation unit 408 includes, for example, a button for receiving an operation performed on the smart device 301 by the user. The display unit 407 and the operation unit 408 may be configured with a common member, such as a touch panel.

The voice input and voice processing unit 409 may be configured to acquire a voice uttered by the user via, for example, a general-purpose microphone built into the smart device 301 and acquire an operation command from the user by voice recognition processing.

The voice input and voice processing unit 409 also acquires a voice command uttered by the user via a dedicated application in the smart device 301. The voice command can be registered as a specific voice command for causing the voice processing unit 214 of the image capturing apparatus 101, to recognize the specific voice command via the communication 302 by the wireless LAN.

The GPS reception unit 405 receives GPS signals notified from satellites, analyzes the GPS signals, and estimates a current position (longitude and latitude information) of the smart device 301. Alternatively, regarding the position estimation, the current position of the smart device 301 may be estimated based on information about the wireless network existing in the periphery of the smart device 301 using Wireless Fidelity (Wi-Fi) Positioning System (WPS) and the like. In a case where the acquired current GPS position information indicates a position in a position range (within a range of a predetermined radius) set in advance, movement information is notified to the image capturing apparatus 101 via the Bluetooth® Low Energy control unit 402 and the movement information is used as a parameter for automatic image capturing and automatic editing described below. Further, in a case where there is a position change of a predetermined value or more in the GPS position information, the movement information is notified to the image capturing apparatus 101 via the Bluetooth® Low Energy control unit 402 and is used as the parameter for the automatic image capturing and the automatic editing described below.

As described above, the image capturing apparatus 101 and the smart device 301 exchange data with each other by communication using the wireless LAN control unit 401 and the Bluetooth® Low Energy control unit 402. For example, data, such as the voice signal, the image signal, the compressed voice signal, and the compressed image signal are transmitted and received. The smart device 301 transmits, to the image capturing apparatus 101, an operation instruction to capture an image, voice command registration data, and a predetermined position detection notification and a location movement notification based on the GPS position information. Further, learning data is also transmitted and received via the dedicated application in the smart device 301.

<Sequence of Image Capturing Operation>

Figure 5:
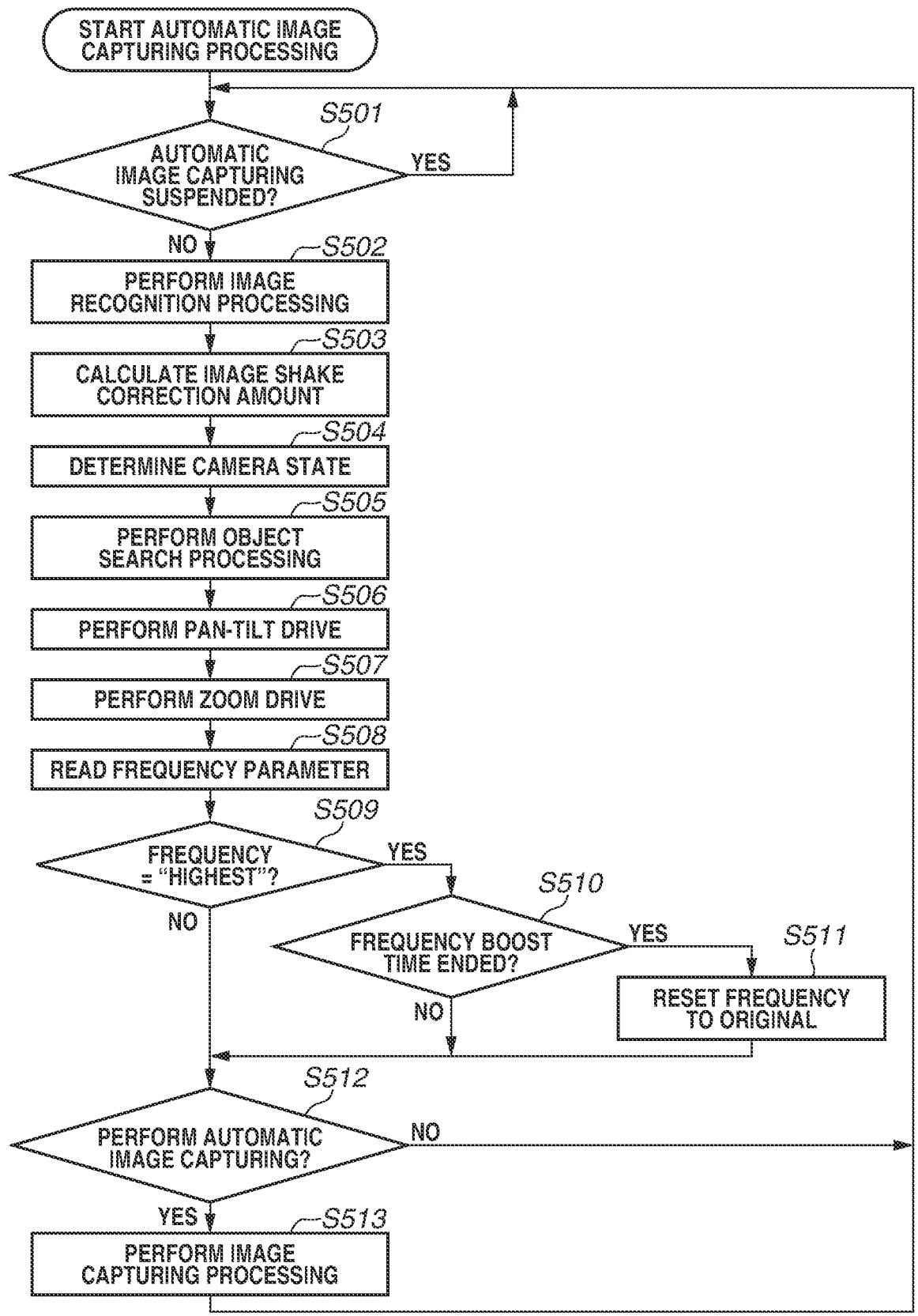
FIG. 5 is a flowchart illustrating automatic image capturing processing.

FIG. 5 is a flowchart illustrating automatic image capturing processing of the image capturing apparatus 101 according to the present exemplary embodiment.

In response to pressing performed on the power supply button on the image capturing apparatus 101 by the user, the processing in the flowchart illustrated in FIG. 5 is started. In the present exemplary embodiment, a connection between the image capturing apparatus 101 and the smart device 301 is always established via the wireless communication, and various operations can be performed from the dedicated application in the smart device 301. The processing in each step in the flowchart described below is realized by the first control unit 223 controlling each unit in the image capturing apparatus 101.

In step S501, the first control unit 223 determines whether the automatic image capturing is in a suspended state. Suspension of the automatic image capturing is described in a flowchart of voice recognition processing described below. In a case where the automatic image capturing is suspended (YES in step S501), the first control unit 223 waits without doing anything until the suspension of the automatic image capturing is released. In a case where the automatic image capturing is not suspended (NO in step S501), the first control unit 223 advances the processing to step S502 and performs image recognition processing.

In step S502, the first control unit 223 causes the image processing unit 207 to perform image processing on a signal acquired by the image capturing unit 206 and to generate an image for object recognition.

The object recognition for, for example, a person and an object, is performed using the generated image.

In a case of recognizing a person, a face and a body of an object are detected. In face detection processing, a pattern for determining a face of a person is specified in advance, and a portion that is included in the captured image and matches the pattern can be detected as a face image of the person.

Reliability indicating certainty as the face of the object is calculated at the same time and is calculated from, for example, a size of a face area in the image and a degree of matching with the face pattern.

Similarly, for object recognition, an object that matches a pattern registered in advance can be recognized.

There is also a method for extracting a characteristic object using histograms of hue, color saturation, and the like in the captured image. In this case, with respect to an image of the object captured in an imaging angle of view, processing for dividing distribution derived from the histograms of the hue, the color saturation, and the like into a plurality of sections and classifying the captured image in each section is executed.

For example, histograms of a plurality of color components are generated for the captured image and divided by a mound-shaped distribution range, the captured image is classified based on an area belonging to a combination of the same sections, and the image area of the object is recognized.

An evaluation value is calculated for each image area of the recognized object, and thus the image area of the object having the highest evaluation value can be determined as a main object area.

Each object information can be obtained from image capturing information by the above-described method.

In step S503, the first control unit 223 calculates an image shake correction amount. Specifically, first, the first control unit 223 calculates an absolute angle of the image capturing apparatus 101, based on an angular velocity and acceleration information acquired by the apparatus shake detection unit 209. Then, the first control unit 223 calculates stabilization angles for moving the tilt rotation unit 104 and the pan rotation unit 105 in angle directions that cancel the absolute angle, and sets the stabilization angles as the image shake correction amount. A calculation method of the image shake correction amount calculation processing can be changed based on learning processing described below.

In step S504, the first control unit 223 determines a state of the image capturing apparatus 101. The first control unit 223 determines what kind of vibration/movement state the image capturing apparatus 101 is currently in, based on an angle and a movement amount detected from the angular velocity information, the acceleration information, the GPS position information, and the like.

For example, in a case where the image capturing apparatus 101 is mounted on a vehicle and captures an image, object information, such as a surrounding landscape, greatly changes in accordance with a traveled distance.

Thus, the first control unit 223 determines whether the image capturing apparatus 101 is in a "vehicle moving image capturing state" in which the image capturing apparatus 101 is mounted on a vehicle and the like and moves at high speed, and the determined state can be used in automatic object search described below.

Further, the first control unit 223 determines whether the image capturing apparatus 101 is in a "stationary image capturing state" in which there is almost no vibration angle, by determining whether a change in an angle is large.

In a case of the "stationary image capturing state", because it can be considered that an angle of the image capturing apparatus 101 itself does not change, object search for stationary image capturing can be performed.

In a case where the angle change is relatively large, the first control unit 223 determines that the image capturing apparatus 101 is in a "portable image capturing state", and object search for portable image capturing can be performed.

In step S505, the first control unit 223 performs object search processing. The object search includes following processing.

(1) Area Division

Figure 8A:
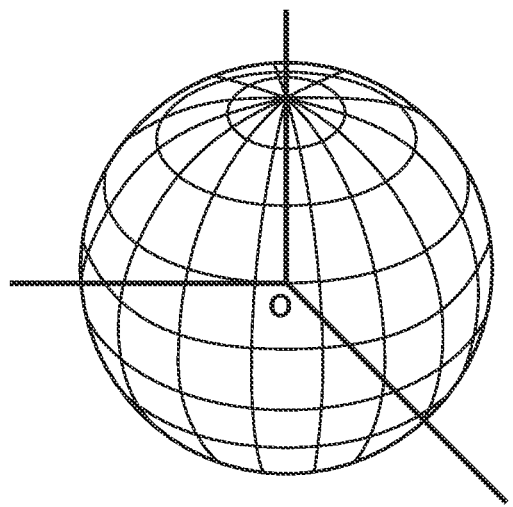
FIG. 8A is a diagram illustrating area division in a captured image.
Figure 8B:
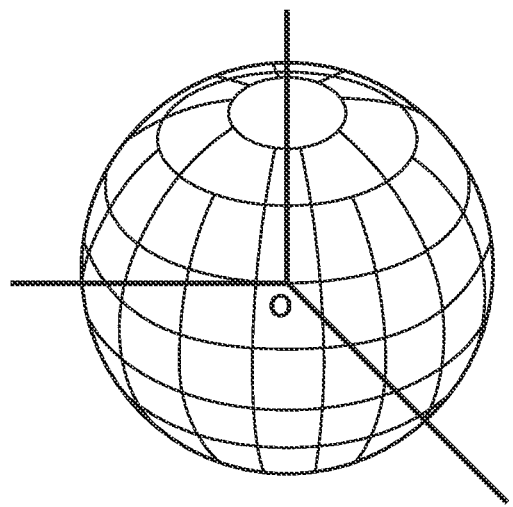
FIG. 8B is a diagram illustrating area division in a captured image.
Figure 8C:
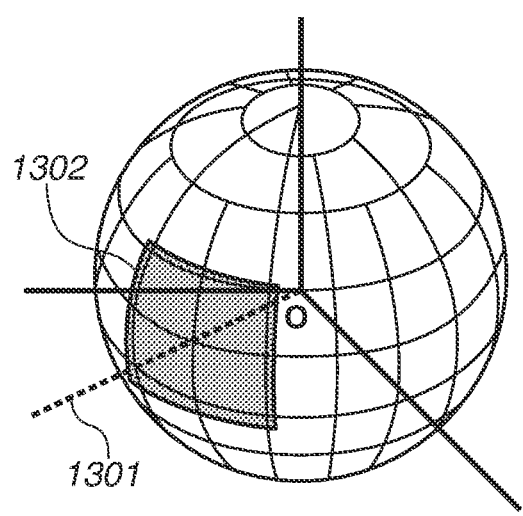
FIG. 8C is a diagram illustrating an example case of area division within an imaging angle of view.
Figure 8D:
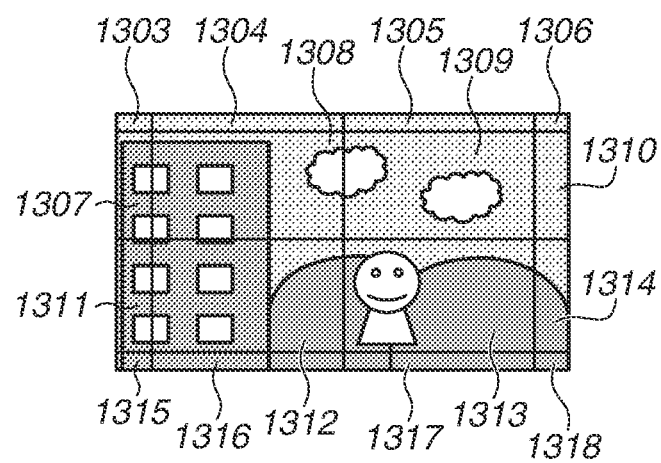
FIG. 8D is a diagram illustrating an image example of the example case of area division within the imaging angle of view.

Area division is described with reference to FIGS. 8A to 8D. As illustrated in FIG. 8A, the area division is performed on an entire periphery centering on the image capturing apparatus position (the image capturing apparatus position is denoted as a point of origin O). In the example in FIG. 8A, the area is divided by 22.5 degrees each in the tilt direction and the pan direction. In a case where the area is divided as illustrated in FIG. 8A, a circumference in a horizontal direction becomes smaller and an area becomes smaller as the angle in the tilt direction is separated from 0 degrees. Thus, in the image capturing apparatus 101 according to the present exemplary embodiment, an area range in the horizontal direction is set larger than 22.5 degrees in a case where the tilt angle is 45 degrees or more as in FIG. 8B. FIGS. 8C and 8D illustrate an example case in which area division is performed within the imaging angle of view. An axis 1301 indicates a direction of the image capturing apparatus 101 at the time of initialization, and the area division is performed using this direction angle as a reference position. An angle of view area 1302 of an image being captured is illustrated, and an example of the image at that time is illustrated in FIG. 8D. The image captured in the angle of view is divided into images 1303 to 1318 as illustrated in FIG. 8D, based on the area division.

(2) Calculation of Importance Level of Each Area

An importance level indicating a priority order of searching is calculated for each area divided as described above, in accordance with situations of an object existing in the area and a scene of the area. The importance level in accordance with the situation of the object is calculated based on, for example, the number of persons existing in the area, a size of a person's face, a face orientation, certainty of face detection, facial expression of the person, and a personal authentication result of the person. The importance level in accordance with the situation of the scene is calculated based on, for example, a general object recognition result, a scene determination result (blue sky, backlight, evening scene, etc.), a sound level from a direction of the area, a voice recognition result, and movement detection information in the area. Since a vibration state of the image capturing apparatus 101 is detected in the state determination of the image capturing apparatus 101 in step S504, the importance level may be changed based on the vibration state. For example, in a case where the first control unit 223 determines that the image capturing apparatus 101 is in the "stationary image capturing state", the importance level is determined to be higher when face authentication of a specific person is detected, whereby object search is performed mainly on a high priority object (for example, the user of the image capturing apparatus 101) registered in the face authentication. Further, the automatic image capturing described below is also performed by giving priority to the above-described face, whereby, even in a case where the user of the image capturing apparatus 101 spends a lot of time wearing and carrying the image capturing apparatus 101 around to capture an image, many images in which the user is captured can be also obtained by putting down and placing the image capturing apparatus 101 on a desk or the like. In such stationary state, since searching can be performed by pan-tilt drive, an image in which the user is captured and a group photo in which many faces are captured can be obtained by appropriately placing the image capturing apparatus 101, without consideration of an angle to place the image capturing apparatus 101. Under the above-described conditions alone, the area with the highest importance level will be the same as long as there is no change in each area, and as a result, the area to be searched will remain the same throughout. Thus, the importance level is changed according to past image capturing information. Specifically, the importance level may be lowered in the area that has been continuously designated as the search area for a predetermined period, or the importance level may be lowered in the area in which image capturing is performed in step S513 described below for a predetermined period.

(3) Determination of Search Target Area

After the importance level is calculated for each area as described above, the area with the high importance level is determined as a search target area. Then, a pan-tilt search target angle for capturing the search target area in the angle of view is calculated.

In step S506, the first control unit 223 performs the pan-tilt drive. Specifically, a pan-tilt drive amount is calculated by adding a drive angle in control sampling based on the image shake correction amount and the pan-tilt search target angle, and the lens barrel rotation drive unit 205 separately controls driving of the tilt rotation unit 104 and driving of the pan rotation unit 105.

In step S507, the first control unit 223 controls the zoom unit 201 to perform zoom drive. Specifically, the zoom drive is performed in response to the state of the search target object determined in step S505. For example, in a case where the search target object is a face of a person, and if a face in the image is too small and is smaller than a detectable minimum size, the face cannot be detected, and there is a possibility of losing sight of the face. In such a case, control is performed to increase the size of the face in the image by zooming to a telephoto side. On the other hand, in a case where a face in the image is too large, the object may easily fall outside the angle of view due to movement of the object and the image capturing apparatus 101 itself. In such a case, control is performed to reduce the size of the face in the image by zooming to a wide-angle side. The zoom control is performed as described above, and the image capturing apparatus 101 can maintain a state suitable for tracking the object.

While, in steps S505 to S507, the method for performing the object search by the pan-tilt drive and the zoom drive is described, but the object search may be performed by an image capturing system that captures images in all directions at once using a plurality of wide-angle lenses. In a case of an omnidirectional camera, an enormous amount of processing is required if image processing, such as object detection, is performed using all signals obtained by image capturing as input images. Thus, the image capturing system is configured to clip a part of an image and perform detection processing for an object within a range of the clipped image. The importance level is calculated for each area as with the above-described method, a clipping position is changed based on the importance level, and automatic image capturing described below is determined. Accordingly, power consumption by the image processing can be reduced, and object search can be performed at high speed.

In step S508, the first control unit 223 reads a frequency parameter. The frequency parameter is a setting value indicating ease of automatic image capturing. The user can set any frequency from among options, such as "low", "medium", and "high", via the dedicated application of the smart device 301. In a case where the frequency is set to "high", more images are captured per predetermined time than a case where the frequency is set to "low". In a "medium" setting, the number of images between "low" and "high" settings is captured. In addition, the frequency can be automatically changed by frequency setting processing described below.

In step S509, the first control unit 223 determines whether the read frequency parameter is a predetermined value. For example, in a case where the first control unit 223 determines that "highest" is set as the frequency for performing the automatic image capturing (YES in step S509), the processing proceeds to step S510. In a case where the first control unit 223 determines that "highest" is not set as the frequency for performing the automatic image capturing (NO in step S509), the processing proceeds to step S512. The frequency setting of "highest" is an automatically changed setting changed by the frequency setting processing described below, whereas a normal frequency setting set by the user using the dedicated application of the smart device 301 is set from among the options of "low", "medium", and "high" as described above. In other words, the frequency is not set to "highest" by a user operation.

In step S510, the first control unit 223 determines whether a frequency boost time for resetting the setting of the frequency parameter, which is started in step S705 described below, from "highest" to an original setting is ended. In a case where the first control unit 223 determines that the frequency boost time is ended (YES in step S510), the processing proceeds to step S511. In a case where the first control unit 223 determines that the frequency boost time is not ended (NO in step S510), the processing proceeds to step S512.

In step S511, since the frequency boost time is ended, the first control unit 223 resets the frequency parameter to the original frequency setting set before being set to "highest". In this process, in a case where a predetermined number of images or more is captured by the automatic image capturing during the frequency boost time, the frequency boost time may be extended because it can be determined that a current scene is a scene to be captured. Accordingly, the image capturing apparatus 101 can further continue to capture the scene that the user wants to capture.

In step S512, the first control unit 223 determines whether to perform the automatic image capturing.

Determination of whether to perform the automatic image capturing is described. The determination of whether to perform the automatic image capturing is performed based on whether an importance score exceeds a predetermined value. The importance score is a parameter for use in determining whether to perform the automatic image capturing and is different from the importance level for determining the search area. A point is added to the importance score according to a detection status of the object and the passage of time. As an example, a description is given of a case where the image capturing apparatus 101 is designed to perform the automatic image capturing when the importance score exceeds 2000 points. In this case, first, an initial value of the importance score is 0 points, and a point is added according to a time elapsed from when the image capturing apparatus 101 enters an automatic image capturing mode. The importance score increases at an increasing rate of, for example, reaching 2000 points after 120 seconds when there is no high priority object. In a case where 120 seconds elapse without the high priority object being detected, the importance score reaches 2000 points by addition of points with the passage of time, and an image is captured. In addition, in a case where the high priority object is detected during the passage of time, 1000 points are added. Thus, the importance score more easily reaches 2000 points in a state where the high priority object is detected, and as a result, image capturing frequency tends to increase.

Further, for example, in a case where a smiling face of the object is recognized, 800 points are added. Addition of points based on a smiling face is also performed even in a case where the object is not a high priority object. In the present exemplary embodiment, a description is given using an example case in which points to be added based on a smiling face are the same regardless of whether a smiling face is detected in a facial expression of a high priority object, but the configuration of the present exemplary embodiment is not limited to this. For example, points to be added based on detection of a smiling face in a facial expression of a high priority object may be higher than points to be added based on detection of a smiling face in a facial expression of a low priority object. Accordingly, it is possible to capture an image closer to an intention of the user. In a case where the importance score exceeds 2000 points by point addition due to a change in the facial expression of the object, the automatic image capturing is performed. Further, even in a case where the importance score does not exceed 2000 points by the point addition due to the change in the facial expression, the importance score reaches 2000 points in a shorter time by the subsequent point addition due to the passage of time.

The point addition due to the passage of time is described using a following case as an example. For example, in a case where points are added to reach 2000 points in 120 seconds, 2000/120 points are added every second, in other words, points are linearly added with respect to a time. However, the present exemplary embodiment is not limited to this configuration. For example, the point addition may be increased in such a manner that the point is not added up to 110 seconds of 120 seconds, and 200 points are added per second to reach 2000 points in 10 seconds from 110 seconds to 120 seconds. Accordingly, it is possible to prevent the importance score from reaching the points for performing image capturing by the point addition due to the change in the facial expression of the object regardless of high or low priority. In a case of the point addition method in which the point linearly increases with the passage of time, because a state in which the points are already added due to the passage of time is long, the importance score often reaches the point for performing image capturing even in a case where the points are added by a change in the facial expression of the low priority object to a smiling face, and it is difficult to reflect the high or low priority. However, if the point to be added due to a change in the facial expression is lowered, a timing of a change in the facial expression may be missed, and thus lowering the point to be added is not a desirable measure. Consequently, the point addition is set in such a manner that the point is not added up to 110 seconds. In this case, 110 seconds elapse without adding a point in a case of the low priority object. On the other hand, since 1000 points are added in a case of the high priority object, even in a case where there is no point addition due to the passage of time up to 110 seconds, 1000 points are added in the case of the high priority object. Accordingly, in a case where points are added due to a change in the facial expression, a possibility that the importance score of a case of the low priority object reaches the points for performing image capturing can be suppressed compared with a case of the high priority object, whereby the high-low priority can easily function. A change in the facial expression is described as an example in the above description, but in addition to that, a reference for adding points may include a case where a voice becomes louder and a case where a gesture becomes larger. The above-described difference in the point addition method may also be applied to these cases to facilitate functioning of the high-low priority.

Even in a case where the importance score does not exceed 2000 points by a movement of the object, an image is captured in 120 seconds by the passage of time, and there is no possibility that an image will not be captured at all for a certain period of time.

In a case where the object is detected in the middle, the time to start increasing the importance score may be brought forward within 120 seconds. More specifically, for example, in a case where the high priority object is detected at 60 seconds, the importance score does not exceed 2000 points even with 1000 points added by the detection. However, the importance score may start to linearly increase when 30 seconds elapse after the detection of the object instead of being remained as it is without increasing until 110 seconds. Alternatively, the linear increase may be started 20 seconds, instead of 10 seconds, before the elapse of 120 seconds. Accordingly, a possibility that an image of the high priority object is captured is increased, and the image capturing intended by the user can be more easily realized.

In a case where the automatic image capturing is performed, the importance score is reset to 0 points. The automatic image capturing is not performed until the importance score exceeds 2000 points again.

The frequency parameter is used to control how the importance score increases with the passage of time. In the above-described example, the point addition is set to take 120 seconds until the automatic image capturing is performed in a case where the object is not detected. This is an example of a case where the frequency parameter is "medium", but in a state of the frequency boost (the frequency parameter is "highest"), a way of increasing the importance score is changed to perform the automatic image capturing at 60 seconds. In this case, 2000/60 points may be added every second, or, for example, no point is added until 55 seconds, and 400 points may be added every second for remaining 5 seconds before the elapse of 60 seconds. An advantage of the latter case is as described above. As another example of frequency, it may be designed such that, in a case where the frequency parameter is "high", the importance score is increased to 2000 points in 100 seconds, and in a case where the frequency parameter is "low", the importance score is increased to 2000 points in 240 seconds. As described above, in a case where the frequency parameter is "highest", at least one image is captured in a shortest time (i.e., 60 seconds in the example case according to the present exemplary embodiment). Thus, increasing the frequency of image capturing means increasing the number of images to be captured per unit time by changing the point addition method, and decreasing the frequency of image capturing means decreasing the number of images to be captured per unit time by changing the point addition method.

The description given above is for the determination processing of whether to perform the automatic image capturing. In a case where it is determined to perform the automatic image capturing by the above-described determination (YES in step S512), the processing proceeds to step S513, and in a case where it is determined not to perform the automatic image capturing (NO in step S512), the processing returns to step S501.

In step S513, the first control unit 223 performs image capturing processing. The image capturing processing described here includes still image capturing and moving image capturing.

Figure 6:
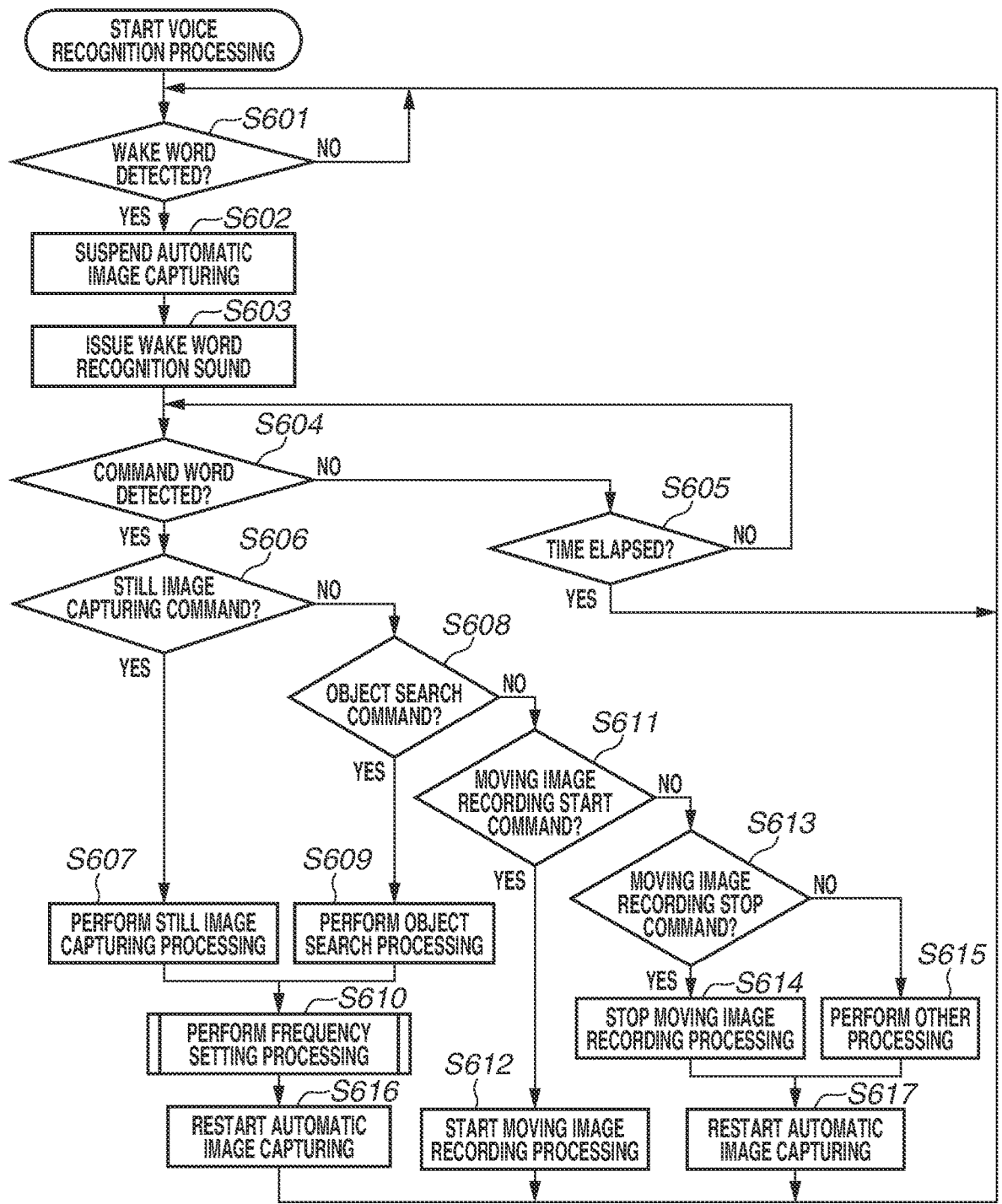
FIG. 6 is a flowchart illustrating voice recognition processing.

FIG. 6 is a flowchart illustrating voice recognition processing by the image capturing apparatus 101 according to the present exemplary embodiment. In a case where a voice uttered by the user is input to the microphone built into the image capturing apparatus 101, the voice input and voice processing unit 409 performs voice recognition processing and acquires an operation command from the user.

In step S601, the first control unit 223 determines whether a wake word is detected. The wake word is a startup command to start recognition of a voice command that is for issuing a specific instruction to the image capturing apparatus 101 by voice. In a case where an instruction is issued by voice, it is necessary that a command word is issued after recognition of the wake word and is successfully recognized. In a case where the first control unit 223 determines that the wake word is detected (YES in step S601), the processing proceeds to step S602. In a case where the first control unit 223 determines that the wake word is not detected (NO in step S601), the processing in step S601 is repeated until the wake word is detected.

In step S602, the first control unit 223 suspends the automatic image capturing processing. It is because that the image capturing apparatus 101 enters a command word waiting state once the wake word is recognized, the automatic image capturing processing is suspended. The suspension of the automatic image capturing refers to execution of the object search and the image capturing processing using a pan-tilt operation and a zoom operation. A purpose of suspending the automatic image capturing is to put the image capturing apparatus 101 in the command word waiting state by suspending the automatic image capturing processing in order to quickly respond to an instruction of a command word to be issued following the wake word. In addition, in a case where an image capturing instruction is given by a voice instruction, suspending the automatic image capturing enables the image capturing apparatus 101 to capture an image in a direction in which the user tries to capture the image by stopping the pan-tilt operation.

In step S603, the first control unit 223 issues a recognition sound for indicating the user that the recognition of the wake word is successful.

In step S604, the first control unit 223 determines whether a command word is detected. In a case where the first control unit 223 determines that the command word is detected (YES in step S604), the processing proceeds to step S606. In a case where the first control unit 223 determines that a command word is not detected (NO in step S604), the processing proceeds to step S605.

In step S605, the first control unit 223 determines whether a predetermined time has elapsed after detecting the wake word and entering the command word waiting state. In a case where the first control unit 223 determines that the predetermined time has elapsed (YES in step S605), the first control unit 223 advances the processing to step S601, cancels the command word waiting state, and enters a wake word waiting state. In a case where the first control unit 223 determines that the predetermined time has not elapsed (NO in step S605), the first control unit 223 repeats the processing in step S604 until a command word is detected.

In step S606, the first control unit 223 determines whether the detected command word is a still image capturing command. The still image capturing command is a command to request the image capturing apparatus 101 to capture and record one still image. In a case where the first control unit 223 determines that the detected command is the still image capturing command (YES in step S606), the processing proceeds to step S607. In a case where the first control unit 223 determines that the detected command is not the still image capturing command (NO in step S606), the processing proceeds to step S608.

In step S607, the first control unit 223 performs still image capturing processing. Specifically, the image processing unit 207 converts a signal of an image captured by the image capturing unit 206 into, for example, a JPEG file, and the image recording unit 208 stores the JPEG file in the storage medium 221.

In step S608, the first control unit 223 determines whether the detected command word is an object search command. In a case where the first control unit 223 determines that the detected command is the object search command (YES in step S608), the processing proceeds to step S609. In a case where the first control unit 223 determines that the detected command is not the object search command (NO in step S608), the processing proceeds to step S611.

In step S609, the first control unit 223 performs the object search processing. In a case where the search target area is already determined by the object search processing in step S505, and the object is captured by the pan-tilt drive in step S506 and the zoom drive in step S507, tracking of the object is stopped, and the object search processing is executed to search for another object. This is because if the user instructs the object search in a state in which the object is tracked, it means that there is another object to be captured different from the object currently being captured.

After the processing in step S607 or S609 is completed, in step S610, the first control unit 223 performs the frequency setting processing. The frequency setting processing is processing for setting the frequency parameter for how many images are to be captured within a predetermined time. In the frequency setting processing, described in detail below, executed in step S610, the frequency of image capturing is set to be higher.

In step S611, the first control unit 223 determines whether the detected command word is a moving image recording start command. The moving image recording start command is a command to request the image capturing apparatus 101 to capture and record a moving image. In a case where the first control unit 223 determines that the detected command word is the moving image recording start command (YES in step S611), the processing proceeds to step S612. In a case where the first control unit 223 determines that the detected command word is not the moving image recording start command (NO in step S611), the processing proceeds to step S613.

In step S612, the first control unit 223 start to capture a moving image using the image capturing unit 206 and records the moving image in the storage medium 221. During recording of the moving image, the pan-tilt drive, the zoom drive, and the object search are not performed, and the suspension state of the automatic image capturing is maintained.

In step S613, the first control unit 223 determines whether the detected command word is a moving image recording stop command. In a case where the first control unit 223 determines that the detected command word is the moving image recording stop command (YES in step S613), the processing proceeds to step S614. In a case where the first control unit 223 determines that the detected command word is not the moving image recording stop command (NO in step S613), the processing proceeds to step S615.

In step S614, the first control unit 223 stops capturing and recording the moving image using the image capturing unit 206 and completes the recording as a moving image file in the storage medium 221.

In step S615, the first control unit 223 executes other processing based on a voice command. For example, the first control unit 223 may perform processing for a command for the pan-tilt drive in a direction specified by the user and processing for a command for changing various image capturing parameters, such as exposure correction.

In steps S616 and S617, the first control unit 223 performs restart processing for the automatic image capturing suspended in step S602. Accordingly, the processing in steps S502 to S510 can be performed, and the automatic image capturing is restarted.

In the above-described processing, the frequency setting processing is not executed in the case of the instruction to start or to stop recording the moving image. This is because since a signal from the image capturing unit 206 is continuously recorded after the start of recording the moving image, it is meaningless to set a frequency setting high. The user issues the instruction to stop recording means that a scene to be recorded is finished, and thus, after the stop of recording the moving image, the frequency setting processing is not executed to avoid a needless image from being captured by setting the frequency unnecessarily high.

In a case where a battery remaining amount of the image capturing apparatus 101 is low, or in a case where a temperature of the image capturing apparatus 101 is a predetermined temperature or higher due to heat generation, it is desirable not to frequently operate the image capturing unit 206 and the like. In such a situation, the frequency parameter may not be set to "highest" in step S704 in FIG. 7, which is described below.

Figure 7:
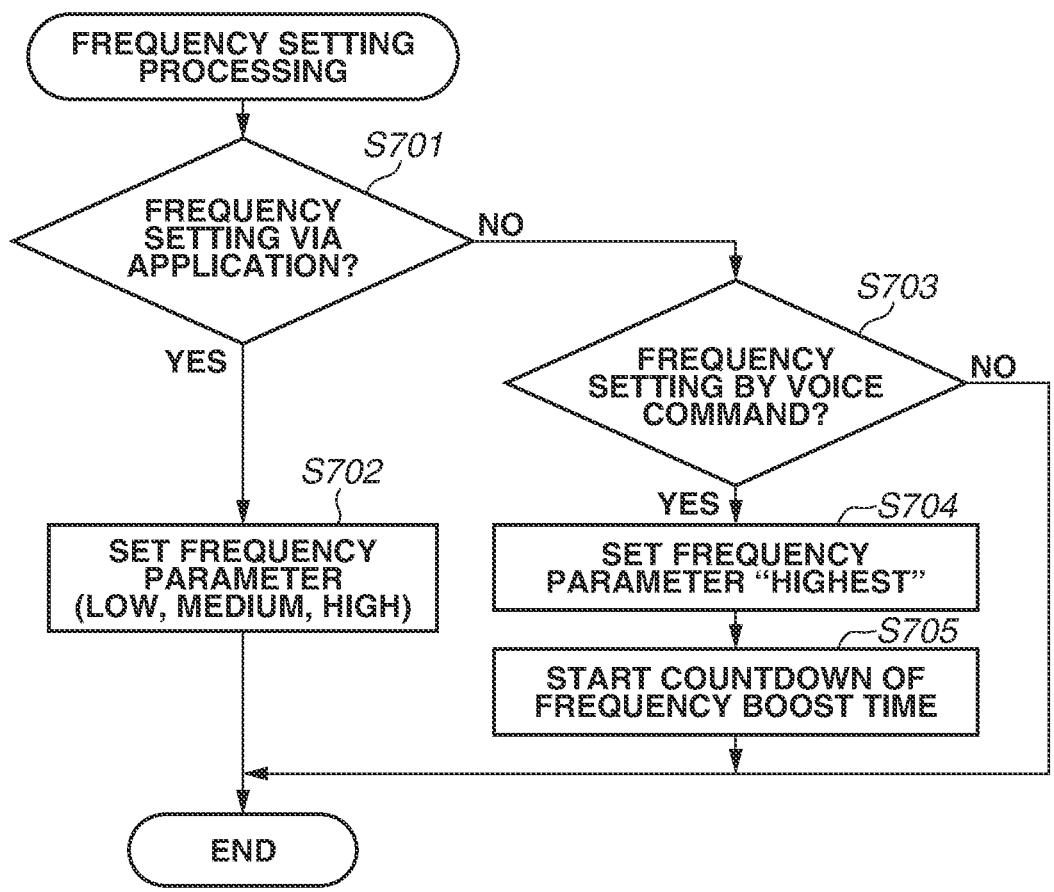
FIG. 7 is a flowchart illustrating frequency setting processing.

FIG. 7 is a flowchart illustrating the frequency setting processing of the image capturing apparatus 101 according to the present exemplary embodiment. Examples of a method to be used by the user to set the frequency to perform the automatic image capturing includes a method for performing the setting via the dedicated application in the smart device 301. The processing in the present flowchart is also started in response to execution of the processing in step S610 in FIG. 6. The processing is also started in response to an instruction issued by the user to change the frequency via the dedicated application in the smart device 301.

In step S701, the first control unit 223 determines whether a frequency setting is performed via the dedicated application in the smart device 301. In a case where the first control unit 223 determines that the frequency setting is performed via the dedicated application (YES in step S701), the processing proceeds to step S702. In a case where the first control unit 223 determines that the frequency setting is not performed via the dedicated application (NO in step S701, for example, in a case where the frequency setting is executed in step S610), the processing proceeds to step S703.

In step S702, the first control unit 223 sets the frequency parameter specified by the user. For example, the user can set the frequency by selecting from among "low", "medium", and "high" that are items of an automatic image capturing frequency on a screen of the dedicated application in the smart device 301 as illustrated in FIG. 9.

An application screen in FIG. 9 is described.

The dedicated application of the smart device 301 provides a still image and a moving image as a content to be automatically captured. The user can set, from the dedicated application, whether to prioritize a still image or a moving image as the content to be automatically captured. The user can change the setting by touching (flicking) a knob of a slider bar as illustrated in FIG. 9. In a case where the setting is set to prioritize a still image, still images are captured more than moving images. In a case where the setting is set to prioritize a moving image, moving images are captured more than still images.

In addition, the user can set how many degrees from a front direction as a range for searching for a scene to be captured by the image capturing apparatus 101. In the example in FIG. 9, three patterns can be set, that is a range of 60 degrees at 30 degrees each to the left and right sides from the front, a range of 180 degrees at 90 degrees each to the left and right sides from the front, and the whole circumference. The dedicated application may be configured to receive an input of a numerical value to accept a finer range setting.

In a case where an image is automatically captured, there is a concern that the captured contents will be too many. Thus, the image capturing apparatus 101 has a function of automatically deleting an image, and, the function can be turned on and off from the smart device 301. As an image to be automatically deleted, for example, images may be deleted in the order of captured date and time from oldest to newest, or may be deleted in ascending order of importance. The importance described here is a numerical value converted from a parameter estimating an image that the user wants to store, for example, in a case of a still image, whether there is little blurring, or a person is captured. Further in a case of a moving image, the importance is calculated by quantifying, for example, whether a person is captured in the image and whether a human voice, such as a conversation, is recorded. Then, an image having a greater total value is regarded that the importance is higher.

The above description is for the application screen illustrated in FIG. 9. Returning to the description of FIG. 7.

In step S703, the first control unit 223 determines whether the frequency setting is called from the voice recognition processing. In a case where the first control unit 223 determines that the frequency setting is called by the voice recognition processing (YES in step S703), the processing proceeds to step S704. In a case where the first control unit 223 determines that the frequency setting is not called by the voice recognition processing (NO in step S703), the frequency setting processing is terminated.

In step S704, the first control unit 223 sets the frequency parameter to higher frequency than the frequency that can be set in step S702. This is because a timing specified by the user to capture an image is at least a timing that the user wants to capture an image. In other words, at the timing specified by the user to capture an image, the user is in a situation that the user wants to capture an image, and thus it can be considered that a scene that the user wants to capture is likely to occur in a period close to the timing. In the light of this point, the image capturing apparatus 101 according to the present exemplary embodiment determines that a certain period after a voice command is input is a scene to be captured and increases the image capturing frequency, by using a voice instruction issued by the voice command from the user as a trigger. Accordingly, the image capturing apparatus 101 can capture an image that the user wants to capture without missing the image capturing opportunity. While, in the present exemplary embodiment, the frequency parameter is set to "highest", the frequency may be increased step by step each time the frequency is set by a voice command instruction. In this case, an upper limit of the frequency is a fastest frame rate of continuous imaging by the image capturing apparatus 101.

In step S705, the first control unit 223 sets the frequency boost time until the frequency parameter set to "highest" in step S704 is reset to an original parameter and starts countdown. For example, in a case where the frequency setting is set to "highest" by the voice command instruction in a state in which the frequency setting is set to "medium", and in a case where the frequency boost time is 60 seconds, the frequency setting is reset to "medium" after a lapse of 60 seconds (actual processing is performed in step S511). The frequency boost time described here is a period during which the frequency is remained at the highest. The frequency boost time is automatically set, but may be set by the user to an arbitrary time.

In this process, the frequency setting set for the frequency boost time may be reset based on whether a predetermined number of images is captured by the automatic image capturing, in addition to based on the lapse of the predetermined time.

Further, in a case where the frequency setting is set to "highest" again by the voice command before the countdown of the frequency boost time is finished, the predetermined time or the predetermined number of images for resetting the frequency setting may be extended.

Determination to reset the frequency setting may be performed based on whether the object search processing is performed in all directions in the pan direction.

While the present invention has been described with reference to the exemplary embodiments, it is to be understood that the present invention is not limited to the disclosed exemplary embodiments, and various modifications and changes can be made without departing from the spirit and the scope of the present invention.

For example, according to the above-described exemplary embodiment, a voice command is described as an example of a method to instruct image capturing from a user. In addition to that, in a case where image capturing is instructed via a communication unit from the smart device 301 and a Bluetooth® Low Energy remote controller, the frequency setting may be set to "highest" after the instruction is executed. In a case where an instruction to execute processing corresponding to a specific vibration pattern using an acceleration sensor in the image capturing apparatus 101 is detected, the frequency setting may also be set to "highest" after the instruction is executed. Further, in a case where a movement of a user's hand is analyzed via the image capturing unit and a gesture instruction by a gesture is received, the frequency setting may also be set to "highest" after the instruction is executed.

The present exemplary embodiment is characterized in that an image desired by a user is captured by tracking an object by the pan-tilt drive and the zoom drive. In this regard, for example, a 360-degree camera may be adopted as an image capturing unit to constantly capture images in all directions, and an image of an object may be acquired by clipping an image in a necessary range from the captured images. In such a case, moving image recording is always executed, and in response to an input of a clipping instruction, a frame rate of the moving image is increased after recording the moving image in a format of a still image. Even in this case, the frame rate may be set to a settable highest rate or a value exceeding a settable value, which is similar to a case of the image capturing frequency according to the above-described exemplary embodiment. As a condition for resetting the increased frame rate to the original setting, similar to the above-described exemplary embodiment, the passage of a certain period of time may be adopted. Thus, recording is performed at the higher frequency near the timing when a user wants to record an image. Accordingly, it is possible to achieve an effect of, for example, facilitating acquisition of an image in which focus on a moving object is not blurred.

In a case where image capturing timing does not come within the frequency boost time, it is conceivable that no image is captured. Thus, first, the image capturing apparatus captures one image when receiving the still image capturing command without performing the pan-tilt drive, the zoom drive, and the object search. Next, the image capturing apparatus continuously captures three images while searching for the object. Then, the image capturing apparatus enters the frequency boost state and performs the automatic image capturing for a predetermined time period. Accordingly, in a case where a user intentionally instructs still image capturing by the still image capturing command, a case where no image is captured can be avoided, and at least four images are captured.

The present invention is not limited to the above-described exemplary embodiments, and various modifications and changes can be made without departing from the spirit and the scope of the present invention. Therefore, the following claims are attached in order to publicize the scope of the present invention.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image capturing apparatus comprising:
   a sound collection unit configured to collect a voice;
   an analysis unit configured to analyze a voice collected by the sound collection unit;
   an automatic image capturing unit configured to automatically capture an image; and
   a setting unit configured to set image capturing frequency of the automatic image capturing unit,
   wherein, in a case where a result of analysis by the analysis unit is a specific voice instruction, the setting unit sets the image capturing frequency higher after an operation is performed according to the instruction,
   wherein, in a case where a predetermined time elapses after the image capturing frequency is set higher by the setting unit, the image capturing frequency is reset to an original setting.

2. The image capturing apparatus according to claim 1, wherein the automatic image capturing unit automatically performs pan, tilt, and zoom of the image capturing apparatus to track an object and automatically captures a still image or a moving image of the object.

3. The image capturing apparatus according to claim 1, wherein the image capturing frequency set by the setting unit is higher than image capturing frequency arbitrarily settable by a user.

4. The image capturing apparatus according to claim 1, wherein, in a case where a predetermined number of images or more is captured by the automatic image capturing unit in a state in which the image capturing frequency is set higher by the setting unit, the predetermined time is extended.

5. The image capturing apparatus according to claim 1, wherein, in a case where the analysis unit recognizes a specific voice instruction in a state in which the image capturing frequency is set higher by the setting unit, the predetermined time is extended.

6. The image capturing apparatus according to claim 1, wherein, in a case where a predetermined number of images is captured by the automatic image capturing unit after the image capturing frequency is set higher by the setting unit, the image capturing frequency is reset to an original setting.

7. The image capturing apparatus according to claim 6, wherein, in a case where the predetermined number of images or more is captured by the automatic image capturing unit in a state in which the image capturing frequency is set higher by the setting unit, the predetermined number of images is increased.

8. The image capturing apparatus according to claim 6, wherein, in a case where the analysis unit recognizes a specific voice instruction in a state in which the image capturing frequency is set higher by the setting unit, the predetermined number of images is increased.

9. The image capturing apparatus according to claim 1, further comprising:
a rotation unit configured to change an orientation of the image capturing apparatus,
wherein, in a case where an object is searched in all directions by the rotation unit after the image capturing frequency is set higher by the setting unit, the image capturing frequency is reset to an original setting.

10. The image capturing apparatus according to claim 1, wherein, in a case where the specific voice instruction analyzed by the analysis unit is an image capturing instruction, the setting unit sets the image capturing frequency higher.

11. The image capturing apparatus according to claim 1, wherein, in a case where the specific voice instruction analyzed by the analysis unit is an instruction to search for an object, the setting unit sets the image capturing frequency higher.

12. The image capturing apparatus according to claim 1, wherein, in a case where the specific voice instruction analyzed by the analysis unit is an instruction to start recording a moving image, the setting unit does not set a frequency setting high.

13. The image capturing apparatus according to claim 1, wherein, in a case where the specific voice instruction analyzed by the analysis unit is an instruction to stop recording a moving image, the setting unit does not set a frequency setting high.

14. The image capturing apparatus according to claim 1, wherein, in a case where a battery remaining amount of the image capturing apparatus is less than a predetermined amount, the setting unit does not set a frequency setting high even in a case where a voice analyzed by the analysis unit is the specific voice instruction.

15. The image capturing apparatus according to claim 1, wherein, in a case where a temperature of the image capturing apparatus is higher than a predetermined temperature, the setting unit does not set a frequency setting high even in a case where a voice analyzed by the analysis unit is the specific voice instruction.

16. The image capturing apparatus according to claim 1, wherein the setting unit sets the image capturing frequency high even in a case where a specific instruction is issued from a mobile terminal via a communication unit, a specific vibration pattern using an acceleration sensor of the image capturing apparatus is detected, or a specific instruction is issued by a gesture instruction that uses a movement of a user's hand as an instruction.

17. A method for controlling an image capturing apparatus including a sound collection unit configured to collect a voice, the method comprising:
analyzing a voice collected by the sound collection unit;
performing automatic image capturing; and
setting image capturing frequency of the automatic image capturing,
wherein, in a case where a result of analysis by the analyzing is a specific voice instruction, the setting is executed to set the image capturing frequency high after an operation is performed according to the instruction,
wherein, in a case where a predetermined time elapses after the image capturing frequency is set higher by the setting unit, the image capturing frequency is reset to an original setting.

18. A non-transitory computer-readable storage medium storing a computer-readable program that causes a computer to execute a method for controlling an image capturing apparatus including a sound collection unit configured to collect a voice, the method comprising:
analyzing a voice collected by the sound collection unit;
performing automatic image capturing; and
setting image capturing frequency of the automatic image capturing,
wherein, in a case where a result of analysis by the analyzing is a specific voice instruction, the setting is executed to set the image capturing frequency high after an operation is performed according to the instruction,
wherein, in a case where a predetermined time elapses after the image capturing frequency is set higher by the setting unit, the image capturing frequency is reset to an original setting.

* * * * *